(12) United States Patent
Bywaters et al.

(10) Patent No.: US 9,359,994 B2
(45) Date of Patent: Jun. 7, 2016

(54) MODULE-HANDLING TOOL FOR INSTALLING/REMOVING MODULES INTO/FROM AN ELECTROMAGNETIC ROTARY MACHINE HAVING A MODULARIZED ACTIVE PORTION

(75) Inventors: Garrett L. Bywaters, Waitsfield, VT (US); Trevor H. Cole, Duxbury, VT (US); Etienne Hancock, Morrisville, VT (US)

(73) Assignee: Northern Power Systems, Inc., Barre, VT (US)

( * ) Notice: Subject to any disclaimer, the term of this patent is extended or adjusted under 35 U.S.C. 154(b) by 711 days.

(21) Appl. No.: 13/240,788

(22) Filed: Sep. 22, 2011

(65) Prior Publication Data

US 2012/0073118 A1   Mar. 29, 2012

Related U.S. Application Data

(60) Provisional application No. 61/385,712, filed on Sep. 23, 2010.

(51) Int. Cl.
*H02K 15/00* (2006.01)
*H02K 15/02* (2006.01)
(Continued)

(52) U.S. Cl.
CPC ............... *F03D 1/003* (2013.01); *F03D 9/002* (2013.01); *H02K 7/1838* (2013.01);
(Continued)

(58) Field of Classification Search
CPC .............. H02K 15/03; H02K 2213/12; H02K 15/0006; H02K 15/02; H02K 7/1838; F03D 1/003; Y10T 29/49009; Y10T 29/53143
USPC ................................................. 29/598, 432
See application file for complete search history.

(56) References Cited

U.S. PATENT DOCUMENTS 2,078,668 A   4/1937   Kilgore
3,708,707 A   1/1973   Kranz
(Continued)

FOREIGN PATENT DOCUMENTS

CH   75705   9/1917
CN   1881758   6/2010
(Continued)

OTHER PUBLICATIONS

PCT International Search Report and Written Opinion dated Jan. 20, 2012 for related PCT/US2011/052885 entitled "Module-Handling Tool for Installing/Removing Modules Into/From an Electromagnetic Rotary Machine Having a Modularized Active Portion," Bywaters et al.
(Continued)

*Primary Examiner* — Livius R Cazan
(74) *Attorney, Agent, or Firm* — Downs Rachlin Martin PLLC

(57) ABSTRACT

A module-handling tool for facilitating installation, servicing, and/or dismantling of a electromagnetic rotary machine, such as an electrical power generator or electric motor, having a modularized active portion. In one embodiment, module-handling tool is configured for a machine having a modularized stator having a number of removable modules. In one example of such stator-module-handling tool, the tool is designed and configured to hold a stator module and be temporarily secured to the rotor of the machine during the process of installing the stator module into the machine or removing the module from the machine. In this example, the module-handling tool also acts as a module carrier for transporting a module to or from the machine.

35 Claims, 13 Drawing Sheets

(51) Int. Cl.
*H02K 7/18* (2006.01)
*F03D 1/00* (2006.01)
*F03D 9/00* (2016.01)
*H02K 1/14* (2006.01)

(52) U.S. Cl.
CPC .......... *H02K 15/0006* (2013.01); *H02K 15/02* (2013.01); *H02K 1/148* (2013.01); *H02K 2213/12* (2013.01); *Y02E 10/725* (2013.01); *Y10T 29/49009* (2015.01); *Y10T 29/53143* (2015.01)

(56) References Cited

U.S. PATENT DOCUMENTS

| | | | |
|---|---|---|---|
| 4,315,171 | A | 2/1982 | Schaeffer |
| 4,424,463 | A | 1/1984 | Musil |
| 4,769,567 | A | 9/1988 | Kurauchi et al. |
| 4,990,809 | A | 2/1991 | Artus et al. |
| 5,196,751 | A | 3/1993 | Spirk |
| 5,675,196 | A | 10/1997 | Huang et al. |
| 5,691,589 | A * | 11/1997 | Keim et al. ............ 310/156.29 |
| 5,844,341 | A | 12/1998 | Spooner et al. |
| 6,093,984 | A | 7/2000 | Shiga et al. |
| 6,265,804 | B1 | 7/2001 | Nitta et al. |
| 6,321,439 | B1 | 11/2001 | Berrong et al. |
| 6,717,323 | B1 | 4/2004 | Soghomonian et al. |
| 6,777,850 | B2 | 8/2004 | Harada et al. |
| 6,781,276 | B1 | 8/2004 | Stiesdal et al. |
| 6,819,016 | B2 | 11/2004 | Houle et al. |
| 6,844,656 | B1 | 1/2005 | Larsen et al. |
| 6,891,298 | B2 | 5/2005 | Gary |
| 6,975,051 | B2 | 12/2005 | Groening et al. |
| 7,113,899 | B2 | 9/2006 | Shah et al. |
| 7,183,689 | B2 | 2/2007 | Schmidt et al. |
| 7,740,107 | B2 | 6/2010 | Lemburg et al. |
| 7,808,136 | B2 | 10/2010 | Knauff |
| 8,061,999 | B2 | 11/2011 | Bagepalli et al. |
| 8,083,212 | B2 | 12/2011 | Numajiri et al. |
| 8,664,819 | B2 * | 3/2014 | Piercey et al. ............ 310/156.12 |
| 8,789,274 | B2 | 7/2014 | Bywaters et al. |
| 8,816,546 | B2 | 8/2014 | Bywaters et al. |
| 8,912,704 | B2 | 12/2014 | Petter et al. |
| 2002/0074887 | A1 | 6/2002 | Takano et al. |
| 2002/0163272 | A1 | 11/2002 | Larsson et al. |
| 2006/0131985 | A1 | 6/2006 | Qu et al. |
| 2006/0279160 | A1 | 12/2006 | Yoshinaga et al. |
| 2008/0115347 | A1 | 5/2008 | Majernik et al. |
| 2008/0197742 | A1 | 8/2008 | Vollmer |
| 2008/0309189 | A1 | 12/2008 | Pabst et al. |
| 2009/0026858 | A1 | 1/2009 | Knauff |
| 2009/0091210 | A1 | 4/2009 | Bade et al. |
| 2009/0129931 | A1 | 5/2009 | Stiesdal |
| 2009/0172934 | A1 | 7/2009 | Mall et al. |
| 2009/0261668 | A1 | 10/2009 | Mantere |
| 2011/0309712 | A1 | 12/2011 | Chin |
| 2012/0074797 | A1 | 3/2012 | Petter et al. |

FOREIGN PATENT DOCUMENTS

| | | |
|---|---|---|
| DE | 3546226 A1 | 7/1986 |
| DE | 19604643 A1 | 8/1997 |
| DE | 19905748 A1 | 8/1999 |
| DE | 19920309 A1 | 11/1999 |
| DE | 10027246 C1 | 10/2001 |
| DE | 102008063783 A1 | 6/2010 |
| EP | 938181 A1 | 8/1999 |
| EP | 1422806 A2 | 5/2004 |
| EP | 1458080 A1 | 9/2004 |
| EP | 1519040 A1 | 3/2005 |
| EP | 1988282 A2 | 11/2008 |
| EP | 2072814 A2 | 6/2009 |
| EP | 2131475 A2 | 12/2009 |
| EP | 2163528 A1 | 3/2010 |
| EP | 2182570 A1 | 5/2010 |
| EP | 2187506 A1 | 5/2010 |
| EP | 2226502 A1 | 9/2010 |
| EP | 2320080 A1 | 5/2011 |
| ES | 2233146 A1 | 6/2005 |
| JP | 53051407 A | 5/1978 |
| JP | 1231645 A | 9/1989 |
| JP | 4289759 A | 10/1992 |
| JP | 11335074 A | 12/1999 |
| JP | 2004289919 A | 10/2004 |
| JP | 2005210790 A | 8/2005 |
| JP | 2009131030 A | 6/2009 |
| WO | 0060719 A1 | 10/2000 |
| WO | 0121956 A1 | 3/2001 |
| WO | 2004017497 A1 | 2/2004 |
| WO | 2005031159 A1 | 4/2005 |
| WO | 2006032969 A2 | 3/2006 |
| WO | 2006045772 A1 | 5/2006 |
| WO | 2008014584 A1 | 2/2008 |
| WO | 2008021401 A2 | 2/2008 |
| WO | 2008069818 A1 | 6/2008 |
| WO | 2009112887 A1 | 9/2009 |
| WO | 2010024510 A1 | 3/2010 |
| WO | 2010037392 A2 | 4/2010 |
| WO | 2011031165 A1 | 3/2011 |
| WO | PCT/US2011/052883 | 2/2012 |
| WO | PCT/US2011/052879 | 3/2012 |
| WO | PCT/US2011/052882 | 3/2012 |
| WO | PCT/US2011/052893 | 9/2012 |

OTHER PUBLICATIONS

Office Action dated Dec. 19, 2013, in related U.S. Appl. No. 13/240,756, filed Sep. 22, 2011.
Restriction Requirement dated Mar. 11, 2014, in related U.S. Appl. No. 13/240,779, filed Sep. 22, 2011.
Restriction Requirement dated Mar. 13, 2014, in related U.S. Appl. No. 13/240,788, filed Sep. 22, 2011.
Response to Office Action dated Mar. 19, 2014, in related U.S. Appl. No. 13/240,756, filed Sep. 22, 2011.
Notice of Allowance dated Mar. 28, 2014, in related U.S. Appl. No. 13/240,756, filed Sep. 22, 2011.
Response to Final Office Action dated Oct. 25, 2013, in related U.S. Appl. No. 13/240,768, filed Sep. 22, 2011.
RCE dated Oct. 25, 2013, in related U.S. Appl. No. 13/240,768, filed Sep. 22, 2011.
Amendment and Response to Office Action dated Sep. 30, 2013, in related U.S. Appl. No. 13/240,731, filed Sep. 22, 2011.
U.S. Appl. No. 13/240,768, Jun. 25, 2013, Response to Office Action.
U.S. Appl. No. 13/240,768, Aug. 6, 2013, Final Office Action.
U.S. Appl. No. 13/240,731, Apr. 9, 2013, Restriction Requirement.
U.S. Appl. No. 13/240,731, May 9, 2013, Response to Restriction Requirement.
Office Action dated Jun. 10, 2014, in related U.S. Appl. No. 13/240,779, filed Sep. 22, 2011.
Notice of Allowance dated Apr. 25, 2014, in related U.S. Appl. No. 13/240,768, filed Sep. 22, 2011.
Response to Restriction Requirement dated May 12, 2014, in related U.S. Appl. No. 13/240,779, filed Sep. 22, 2011.
Response to Office Action dated May 14, 2014, in related U.S. Appl. No. 13/240,731, filed Sep. 22, 2011.
"Cogging Torque Minimization Technique for Multiple-Rotor, Axial-Flux, Surface-Mounted-PM Motors: Alternating Magnet Pole-Arcs in Facing Rotors," by Metin Aydin, Ronghai Qu, and Thomas A. Lipo, Industry Applications Conference, 38th IAS Annual Meeting, Oct. 12-16, 2003.
"Nature and Measurements of Torque Ripple of Permanent-Magnet Adjustable-Speed Motors," by John S. Hsu, Brian P. Scoggins, Matthew B. Scudiere, et al., Industry Applications Convference, 1995, 30th IAS Annual Meeting, Oct. 8-12, 1995.
"Design Techniques for Reducing the Cogging Torque in Surface-Mounted PM Motors," by Bianchi, N. et al., IEEE Transactions on Industry Applications, Sep./Oct. 2002, 1259-1265, vol. 38, No. 5.
Oxford English Dictionary, Definition of "integra," Mar. 17, 2013.
U.S. Appl. No. 13/240,768, Mar. 15, 2013, Office Action.
U.S. Appl. No. 13/240,731, May 30, 2013, Office Action.

(56) References Cited

OTHER PUBLICATIONS

U.S. Appl. No. 13/240,756, filed Sep. 22, 2011.
U.S. Appl. No. 13/240,768, filed Sep. 22, 2011.
U.S. Appl. No. 13/240,779, filed Sep. 22, 2011.
U.S. Appl. No. 13/240,731, filed Sep. 22, 2011.
Response to Office Action dated Oct. 6, 2014, in related U.S. Appl. No. 13/240,779, filed Sep. 22, 2011, titled "Method and System for Maintaining a Machine Having a Rotor and a Stator."
First Examination Report dated Jun. 12, 2014, in related EU Patent Application No. 11773580.3 entitled "Electromagnetic Rotary Machines Having Modular Active-Coil Portions and Modules for Such Machines."
Notice of Allowance dated Aug. 6, 2014, in related U.S. Appl. No. 13/240,731, filed Sep. 22, 2011.
Related U.S. Appl. No. 14/511,143, Design Process for Low Cogging Torque and Low Torque Ripple Permanent Magnet Machine Rotor and Permanent Magnet Machine Designed Thereby, filed Oct. 9, 2014.
Related U.S. Appl. No. 14/566,193, Sectionalized Electromechanical Machines Having Low Torque Ripple and Log Cogging Torque Characteristics, filed Dec. 10, 2014.
Office Action dated Jan. 29, 2015, in related U.S. Appl. No. 13/240,779, entitled "Method and System for Maintaining a Machine Having a Rotor and a Stator."
Amendment and Response to Final Office Action dated Oct. 13, 2015, in related U.S. Appl. No. 13/240,779, entitled "Method and System for Maintaining a Machine Having a Rotor and a Stator."
Notice of Allowance dated Nov. 10, 2015, in related U.S. Appl. No. 13/240,779, entitled "Method and System for Maintaining a Machine Having a Rotor and a Stator."
Final Office Action dated Aug. 13, 2015, in related U.S. Appl. No. 13/240,779, entitled "Method and System for Maintaining a Machine Having a Rotor and a Stator."

\* cited by examiner

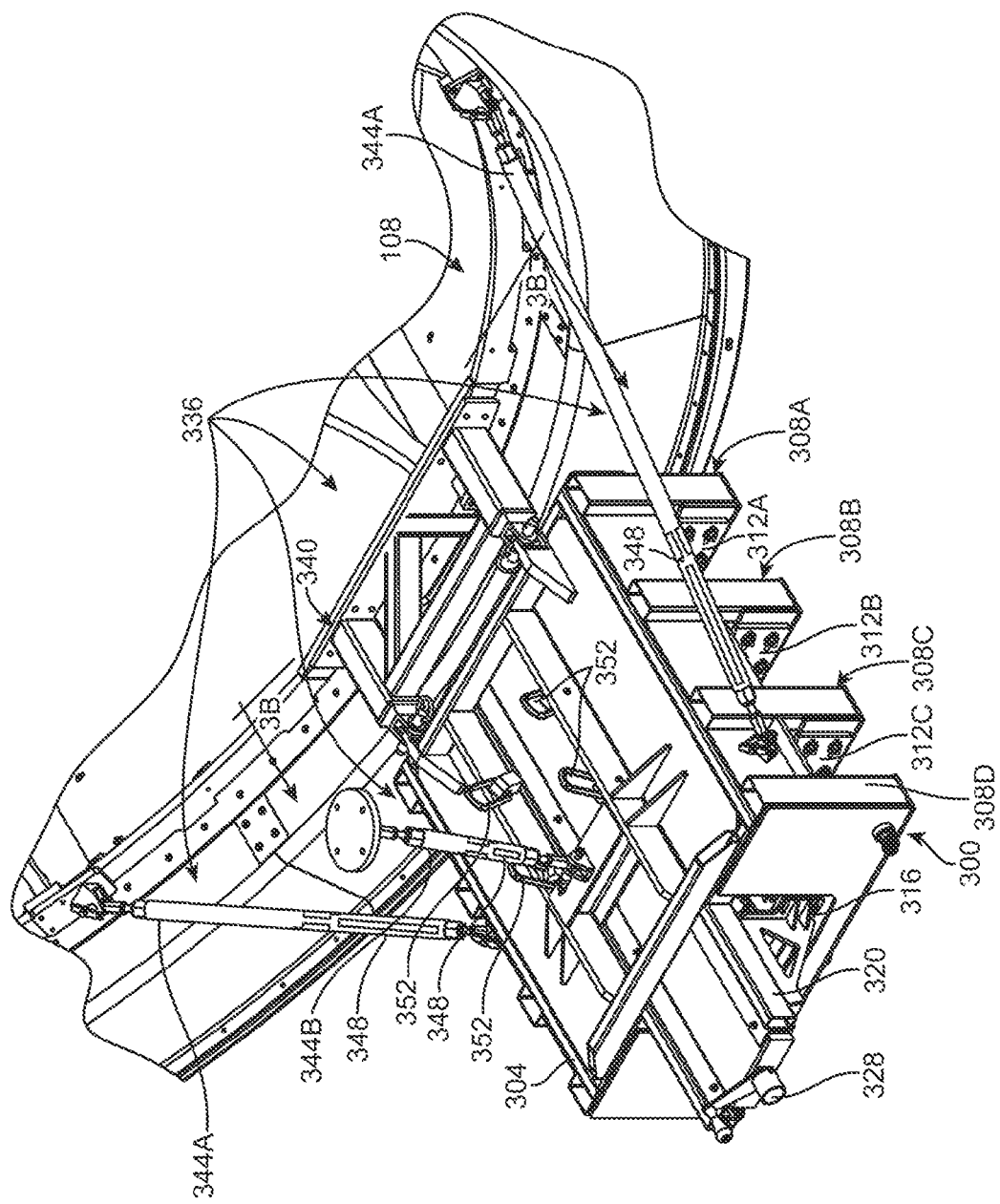

MODULE-HANDLING TOOL FOR INSTALLING/REMOVING MODULES INTO/FROM AN ELECTROMAGNETIC ROTARY MACHINE HAVING A MODULARIZED ACTIVE PORTION

RELATED APPLICATION DATA

This application claims the benefit of priority of U.S. Provisional Patent Application Ser. No. 61/385,712, filed on Sep. 23, 2010, and titled "Module-Handling Tool for Installing/Removing Modules Into/From an Electromagnetic Rotary Machine Having a Modularized Active Portion," which is incorporated by reference herein in its entirety.

FIELD OF THE INVENTION

The present invention generally relates to the field of electromagnetic rotary machines. In particular, the present invention is directed to a module-handling tool for installing/removing modules into/from an electromagnetic rotary machine having a modularized active portion.

BACKGROUND

Certain electromagnetic rotary machines, such as electrical power generators and electric motors, have active portions that are electromagnetically active for the purpose of participating in the generation of electrical power and/or torque, depending on the type and use of the machine. These machines can be very large, for example, having diameters on the order of meters and even tens of meters. Such large machines can present challenges in their construction, shipping, and installation, especially where they are constructed in locations remote from manufacturing facilities. Such large machines can also create maintenance challenges when parts of the active portions fail and need replacement.

SUMMARY OF THE DISCLOSURE

In one implementation, the present disclosure is directed to a module-handling tool for inserting and/or removing an active-portion module into and/or from a module-receiving location in an active portion of an electromagnetic machine. The module-handling tool includes a frame, the frame having a base; a module translation axis; at least one bearing supported by the frame and designed and configured to facilitate the movement of the active-portion module along the module translation axis; a translator designed and configured to move the active-portion module along the translation axis; and a positioning system designed and configured for aligning the frame relative to the module-receiving location of the electromagnetic machine for insertion and/or removal of the active-portion module, respectively, into/from the module-receiving location.

In another implementation, the present disclosure is directed to a method of installing an active-portion module having a plurality of electrically conductive coils into a module-receiving region of an active portion of an electromagnetic machine. The method includes positioning a module-handling tool into a transfer position adjacent the module-receiving region, the module-handling tool supporting the active-portion module; moving the active-portion module from the module-handling tool into the module-receiving location within the active portion so as to transfer the active-portion module from the module-handling tool to the module-receiving region; and removing the module-handling tool from the transfer position.

In still another implementation, the present disclosure is directed to a method of removing an active-portion module from an active portion of an electromagnetic machine. The active portion comprising a plurality of electrically conductive coils, includes securing a module-handling tool to the electromagnetic machine, the module-handling tool configured to receive the active-portion module; moving the active-portion-module from the active portion into the module-handling tool; un-securing the module-handling tool from the electromagnetic machine; and moving the active-portion module away from the electromagnetic machine using the module-handling tool.

In yet another implementation, the present disclosure is directed to a method of installing an active-portion module into a generator of an in-situ wind power unit. The method includes raising a module-handling tool, and an active-portion module supported thereby, proximate to the generator; positioning the module-handling tool into a transfer position; moving the active-portion module into module-receiving location in the generator; removing the module-handling tool from the transfer position; and lowering the module-handling tool away from the generator.

In still yet another implementation, the present disclosure is directed to a method of removing an active-portion module from a generator of an in-situ wind power unit. The method includes raising a module-handling tool proximate to the generator; positioning the module-handling tool into a transfer position; moving the active-portion module into the module-handling tool from the generator; removing the module-handling tool in combination with the active-portion module from the transfer position; and lowering the module-handling tool in combination with the active-portion module away from the generator.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3A is an enlarged perspective view of the module-handling tool of FIG. 1, showing details of this embodiment of the tool;

DETAILED DESCRIPTION

Figure 1:
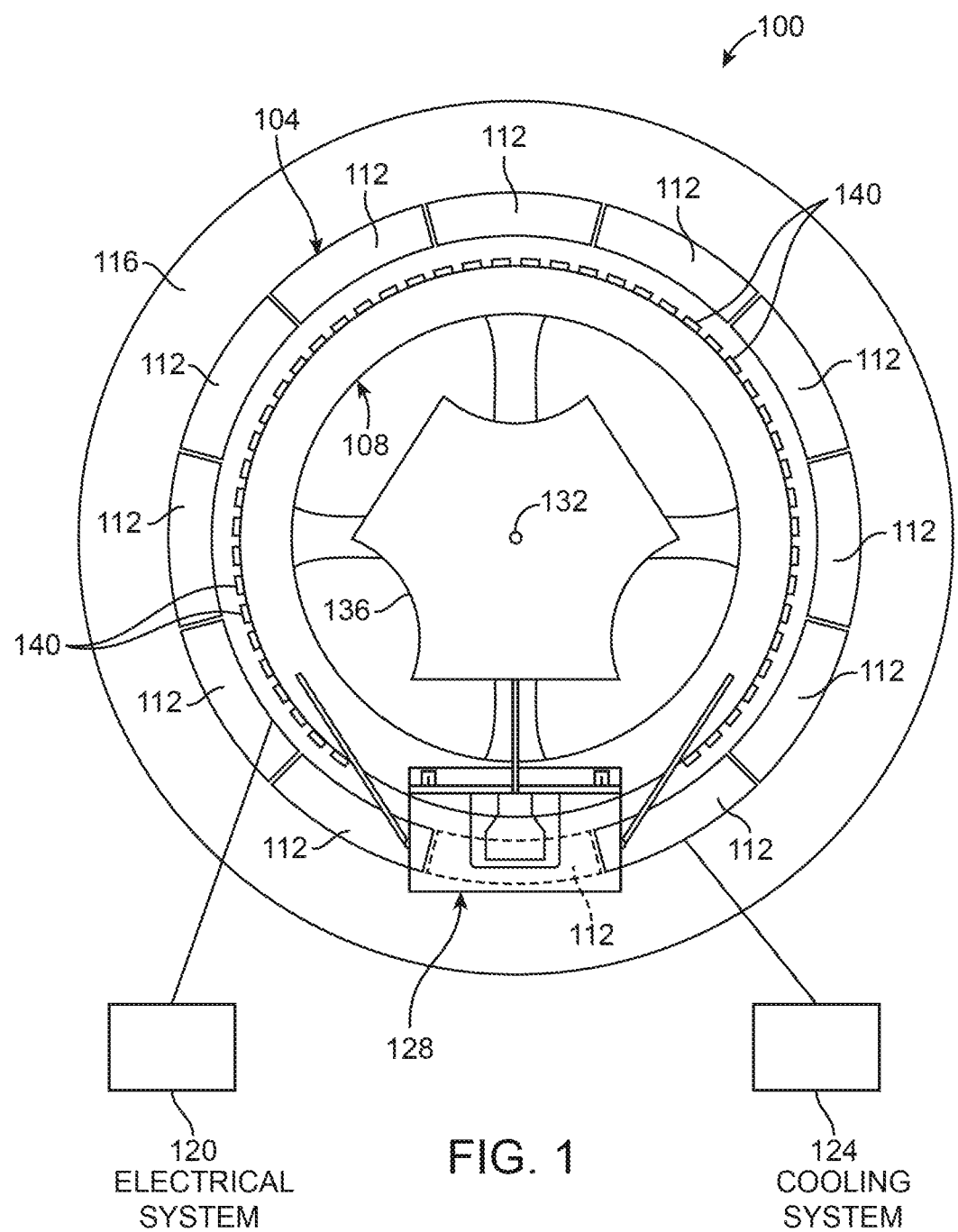
FIG. 1 is a front elevational diagrammatic view of an electromagnetic rotary machine having a modularized stator and a rotor, wherein a stator-module-handling tool is located in a transfer position relative to the machine.

Referring now to the drawings, FIG. 1 shows an exemplary electromagnetic rotary machine 100 having a modularized stator 104 and a rotor 108 disposed largely radially inward from the stator. Modularized stator 104 is composed of a plurality of like stator modules 112 supported by a generally cylindrical stator frame 116 located radially outward from the stator. In this example, stator modules 112 are functionally complete arcuate sections of stator 104 in its finished form, except for any electrical and cooling system connections required to couple adjacent modules to one another and/or connect the modules to the other parts of the respective systems, in this embodiment, electrical system 120 and cooling system 124, respectively. In other words, each module 112 is manufactured in a form that, to become part of a functioning stator, essentially all that needs to be done is to install the module and make final electrical and/or cooling system connections, if any. Exemplary details that module 112 can possess appear below in connection with FIG. 2 and in U.S. patent application Ser. No. 13/240,768, filed on the same date as this application and titled "Electromechanical Rotary Machines Having Modular Active-Coil Portions And Modules For Such Machines," which is hereby incorporated by reference for its teachings of active-portion modules and machines made therewith.

As those skilled in the art will appreciate, the modularity of stator 104 can provide a number of advantages. For example, a very large stator, for example, stators 3 meters or more in diameter, can be readily built in situ, i.e., in the final location of machine 100 of which the stator is part. This can significantly reduce the shipping cost and complexity for large machines. The modularity of stator 104 can also increase serviceability of machine 100 by allowing failed modules to be replaced individually with new modules. In addition, the modularity of stator 104 can also make it easier to dismantle machine 100 at the end of its service life. To facilitate such installation, replacement, and/or removal of stator modules 112, a module-handling tool made in accordance with the present disclosure, such as module-handling tool 128, can be used. Prior to describing a specific example of module-handling tool 128, the particular configuration of stator module 112 that corresponds to that example is first described to set the context for certain features of the tool.

Figure 2:
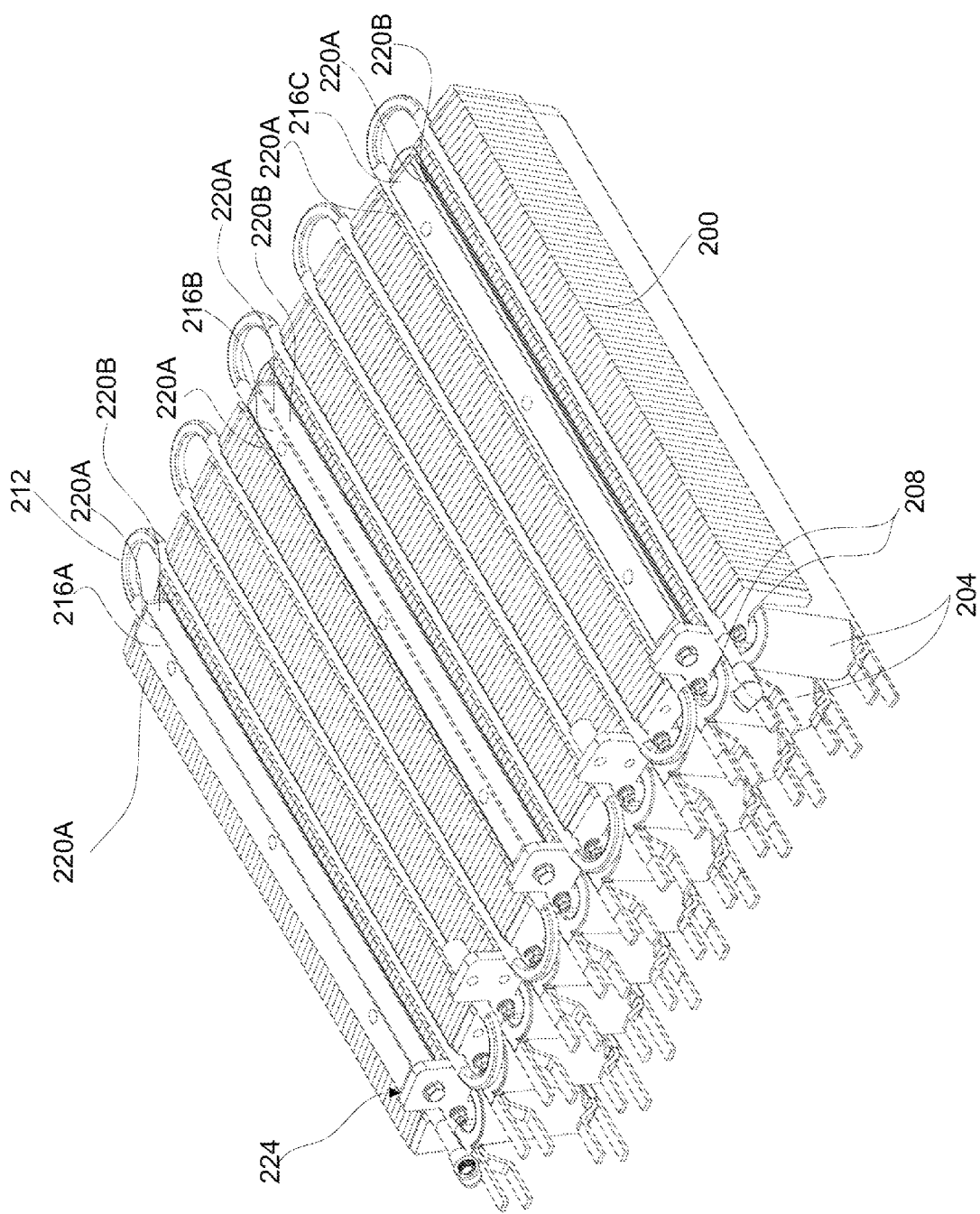
FIG. 2 is a perspective view of one of the stator modules of the modularized stator of FIG. 1.

As shown in FIG. 2, each stator module 112 includes a core 200 and a plurality of electrical windings 204 surrounding corresponding respective teeth 208 of the core. In this embodiment, each stator module 112 also includes an integrated serpentine cooling conduit 212. Each stator module 112 is supported in a radial direction (relative to rotational axis 132 of FIG. 1) by three support members 216A-B (members 216A being outer support members and member 216B being an inner support member) that are generally T-shaped in transverse cross-section and have lateral flanges 220A extending laterally on either side of a central stem 220B. An end member 224 is provided to each module 112 to act as a slide stop when that module is being inserted into machine 100 and also to facilitate securing the module to stator frame 116 (FIG. 1). Details of other components and part of each module 112 can be found in the corresponding patent application incorporated by reference above.

Figure 3B:
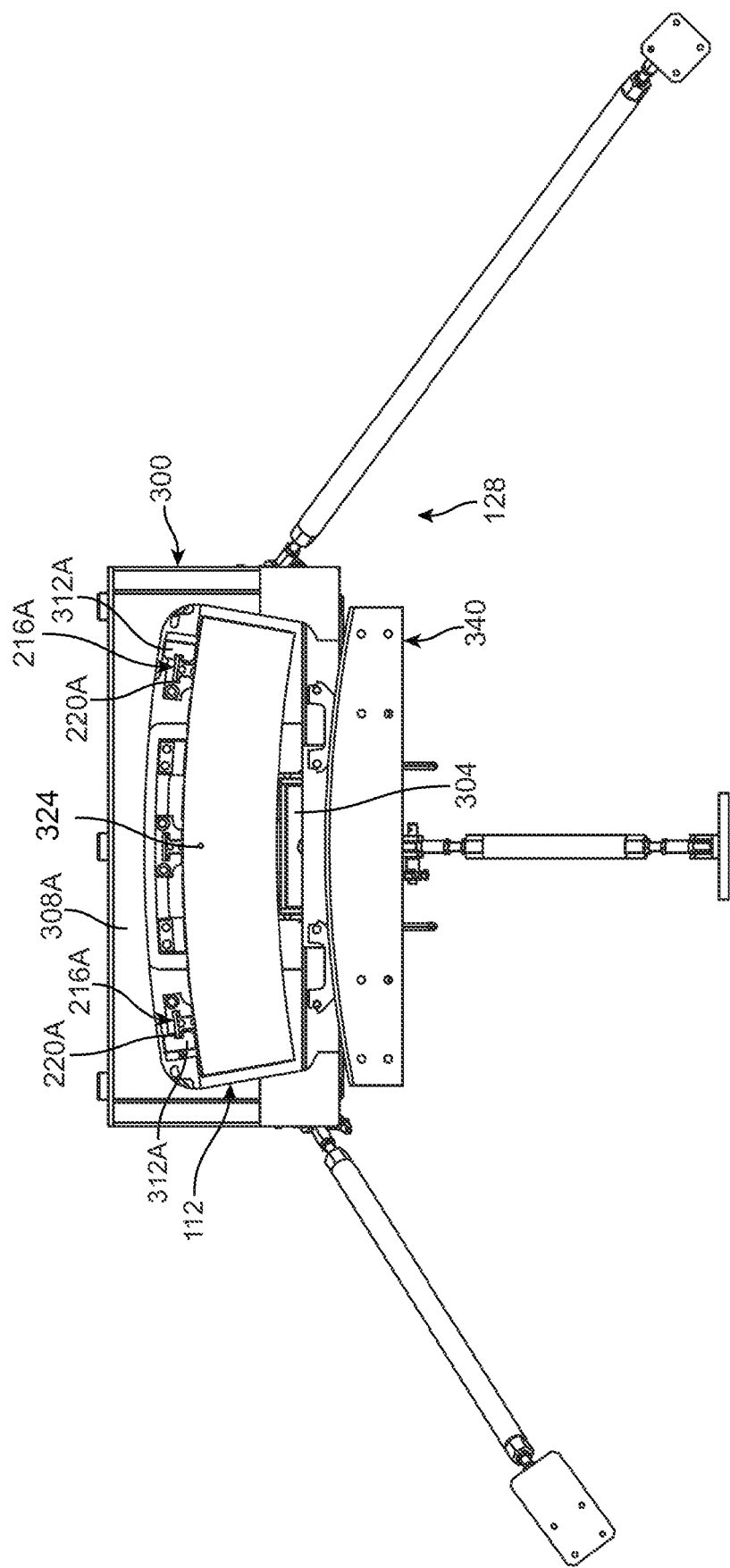
FIG. 3B is an enlarged end view of the module-handling tool as viewed along line 3B-3B of FIG. 3A, showing a stator module engaged with the tool.

FIGS. 3A-B show an exemplary embodiment of module-handling tool 128 that is specifically designed and configured to be used in conjunction with modules 112 described in FIG. 2 and the particular configuration of stator frame 116, which will be described below in conjunction with FIGS. 4A-C below. Referring to FIGS. 3A-B, exemplary module-handling tool 128 includes a frame 300 having a base 304 and a plurality of transverse sub-frames 308A-D, three of which support opposing pairs of support bearings, here roller assemblies 312A-C. As those skilled in the art will readily understand, only the roller assemblies 312A-C on one side of module-handling tool 128 are visible in FIG. 3A. Three more of such assemblies are present on the opposite side of module-handling tool 128 and are supported by corresponding respective ones of sub-frames 308A-D. As illustrated in FIG. 3B, bearing assemblies 312A support module 112 within module-handling tool 128 via the outer ones of flanges 220A on outer support members 216A.

Referring still primarily to FIGS. 3A-B, module-handling tool 128 includes a module hitch 316 connectable to module 112 that module-handling tool is being used to handle. This securement not only stabilizes stator module 112 within module-handling tool 128, but it also provides a positive connection for pulling the stator module out of stator 104 (FIG. 3A) during a module removal operation. In this connection, module hitch 316 is engaged with a hitch track 320 so as to be movable in a direction along a module translation axis 324, which is the axis along which stator module 112 moves when module-handling tool 128 is being used to insert or remove the stator module into or from stator 104 (FIG. 3A). To facilitate the translation of module hitch 316 and stator module 112 when secured to the module hitch, module-handling tool 128 includes a translator, in this example a ball-screw type translator 328. Screw-type translator 328 can be driven by a suitable drive mechanism (not shown), such as a dedicated motor (with or without a ratioed transmission, as needed) permanently attached to module-handling tool 128 or a suitable rotary tool, such as a handheld electric or pneumatic drill-type tool, among others. Those skilled in the art will readily appreciate that other types of translators and drive mechanisms can be used, such as hand-cranked, hydraulic, or pneumatic mechanisms, among others.

In this embodiment, module-handling tool 128 is positioned proximate a module-receiving region 332 of stator 104 using a positioning system 336. Positioning system 336 includes a rotor mount 340 that is fixedly attached to rotor 108 during a module installation/removal procedure, and three struts 344A-B that are used to support module-handling tool 128 and precisely align the tool relative to rotor 108. As those skilled in the art will readily appreciate, modules used with a module-handling tool of the present disclosure can be fairly large and heavy, for example half a ton or more are subjected to very tight tolerances in the module-support system of the electromagnetic machine. In this example, rotor mount 340 is pivotably attached to module frame 300 to provide rotational adjustability to module-handling tool, and struts 344A-B include turnbuckles 348 to provide the necessary adjustability. Rotor mount 340 and rotor 108 include corresponding respective alignment features, such as matching bolt holes, matching pins and holes, matching threaded studs and holes, etc. to precisely mount module-handling tool 128 to the rotor. The various components of struts 344A-B and their end connectors are tightly toleranced to provide very little play. During use of module-handling tool 128, struts 344A are fixedly attached to rotor 108, and strut 344B attached to a rotating structure coupled to rotor 108 of electromagnetic machine 100, such as a hub 136 (FIG. 1) of a wind turbine in the case of the electromagnetic machine being an electrical power generator of a wind power unit. Module-handling tool 128 also includes a plurality of lifting lugs 352 that provide attachment points for hoisting, lowering, and otherwise manipulating the module-handling tool, and module 112 if present therein, as needed.

It is noted that because module-handling tool 128 of this example is coupled entirely to rotor 108 and modules 112 are part of the stationary stator 104, only one mounting location can be provided, and the rotor can be used to at least grossly position the module-handling tool relative to module-receiving region 332. This can be done, for example, using a pony motor (not shown) or other actuator for moving rotor 108. In addition, such means can also be used to finely adjust the rotational angle of rotor 108 relative to module-receiving region 332. It is noted that the rotor-positioning techniques disclosed in U.S. patent application Ser. No. 13/240,779, filed on the same date as this application and titled "Method And System For Maintaining A Machine Having A Rotor And A Stator" can be used to position rotor 108 relative to module-receiving region 332. That application is hereby incorporated by reference for its teachings of such techniques. Once rotor 108 has been properly positioned, it can be fixed in place, for example by installing a pin between the rotor and a fixed structure, such as a bracket on stator 104, or using some other locking means, such as a brake.

Figure 4A:
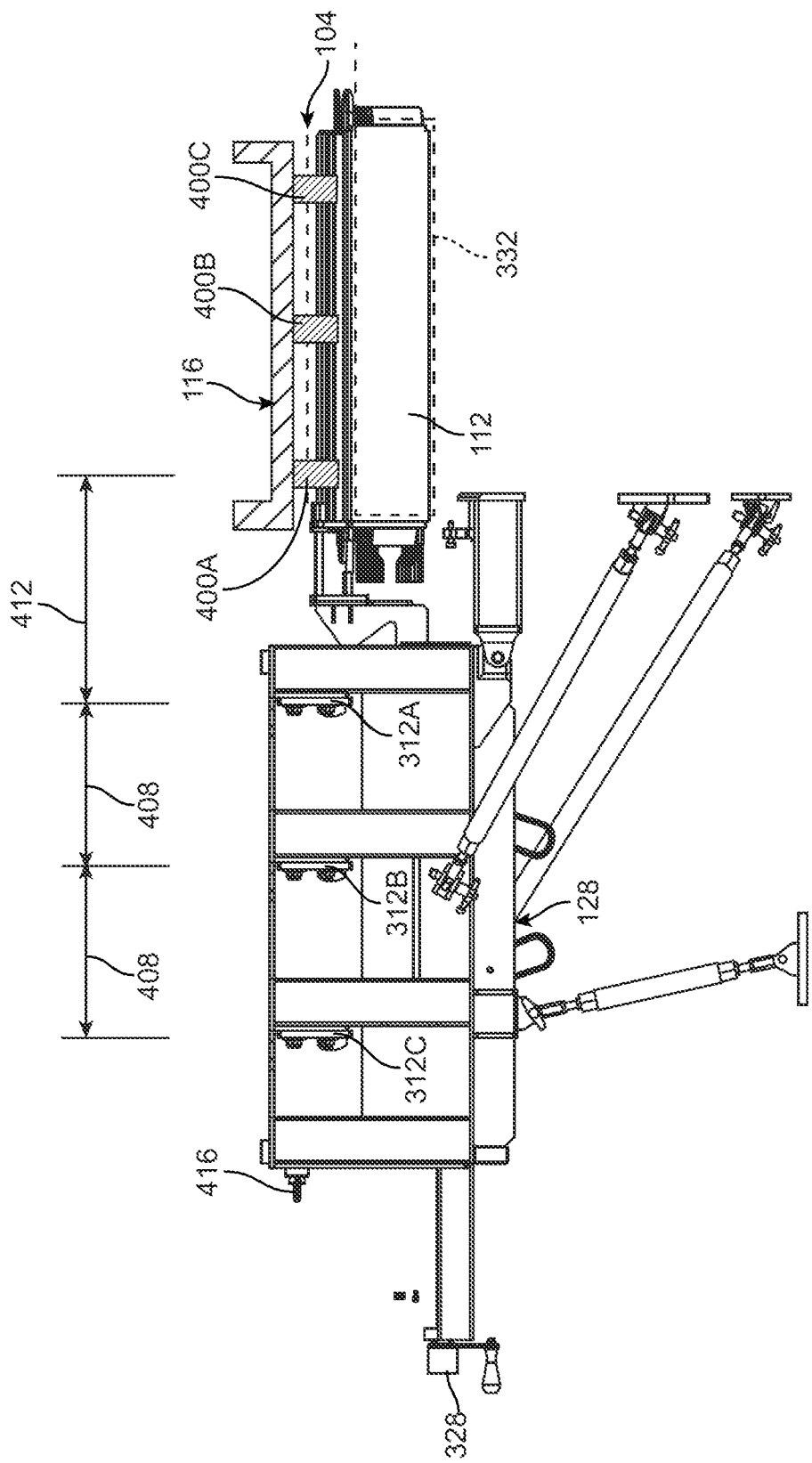
FIGS. 4A-C are enlarged partial side views/partial cross-sectional views of the module-handing tool and stator of FIG. 1, showing the stator module in various positions relative to the tool and stator frame.
Figure 4B:
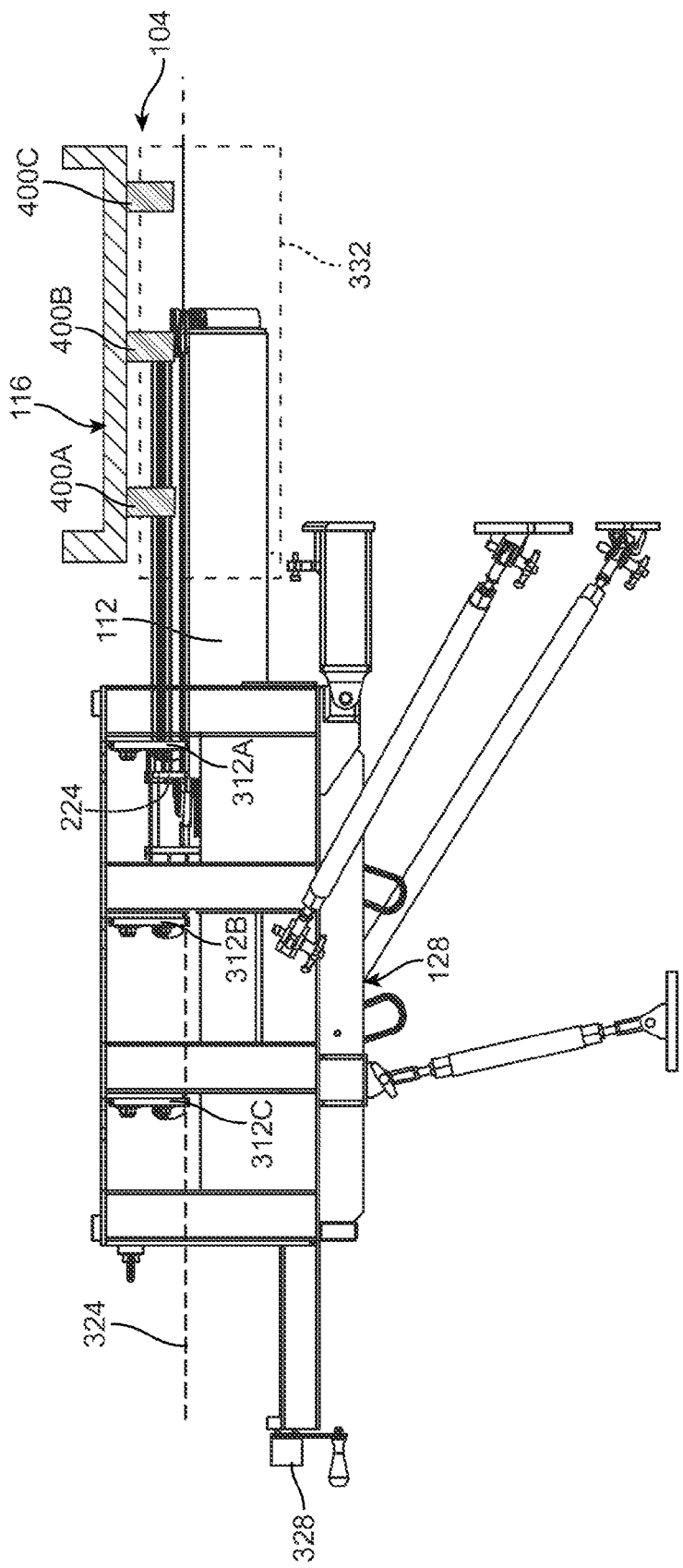
Figure 4C:
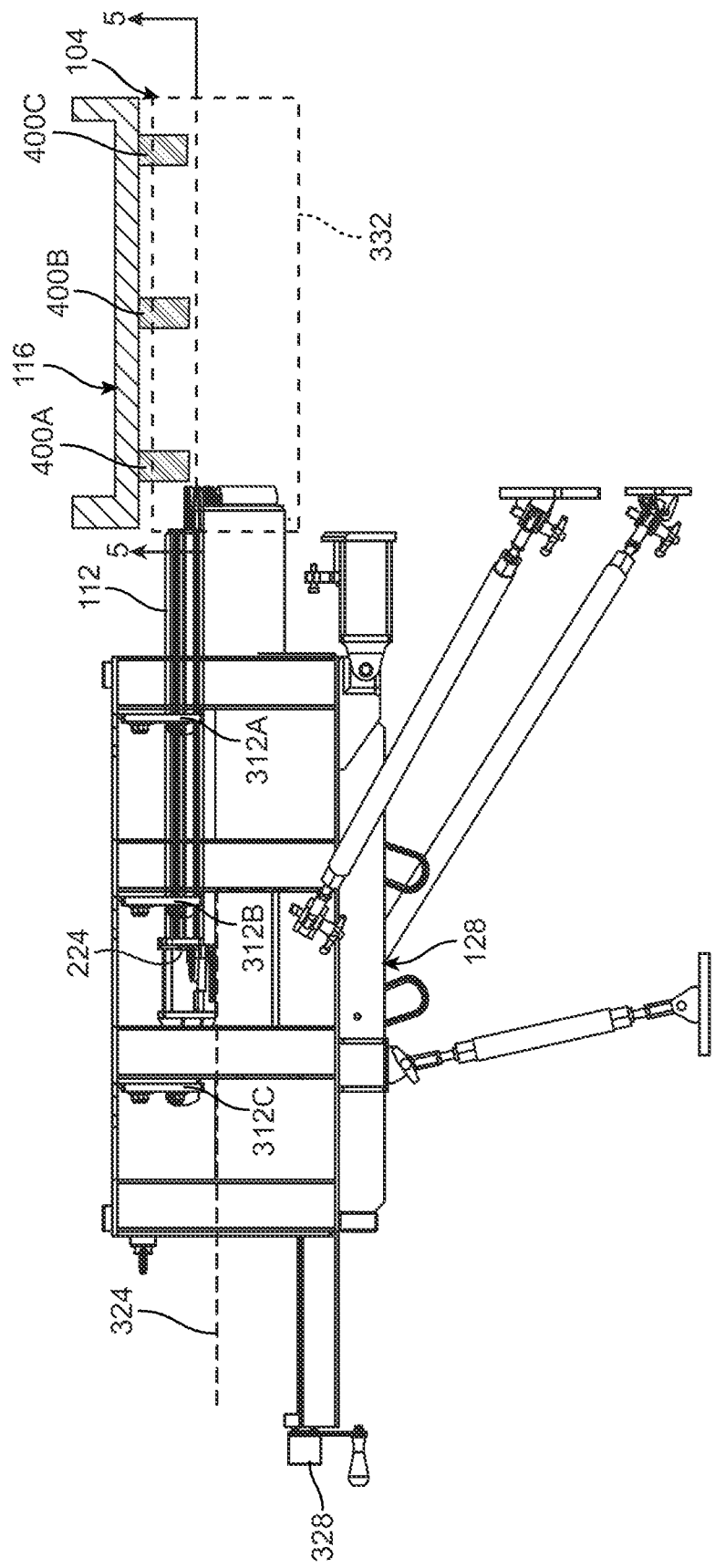
Figure 5:
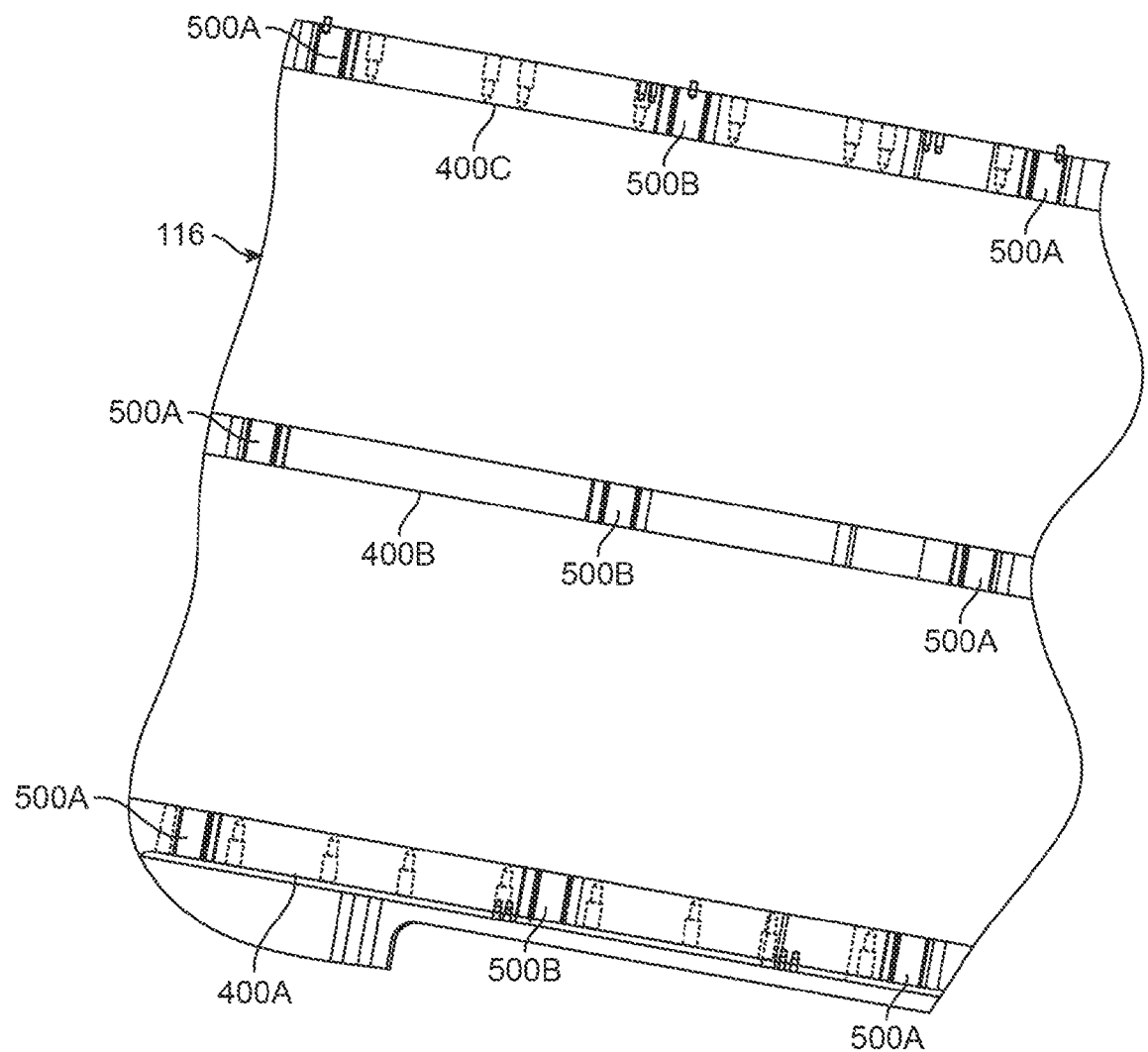
FIG. 5 is an enlarged partial view of the stator frame as viewed from along line 5-5 of FIG. 4C.

FIGS. 4A-C, 5 and 6A-B illustrate a process of removing one of stator modules 112 from module-receiving region 332 of stator 104 after module-handling tool has already been installed and properly positioned at the module-receiving region of the stator. Referring first to FIG. 4A and FIG. 5, FIG. 4A shows module 112 slightly withdrawn from stator 104, but still supported by three spaced module supports 400A-C of stator frame 116. As seen in FIG. 5, in this example, modules supports 400A-C can be characterized as annular members, that extend entirely around the inside of stator frame 116, and in addition to providing support for the installed stator module 112, they act to stiffen the stator frame. Still referring to FIG. 5, at each module-receiving region 332, each module support includes three slotted openings 500A-B shaped to snugly receive corresponding respective ones of support members 216A-B (FIG. 2) of the corresponding stator module 112. Examples of further details of module supports 400A-C, support members 216A-B, and slotted openings can be found in the '768 application incorporated by reference above.

Referring again to FIG. 4A, the spacing 408 between bearing assemblies 312A-C in a direction along module-translation axis 324 and the spacing 412 between the pair of bearing assemblies 312A on module-handling tool 128 and module support 400A are selected so that at no time during the process of moving stator module 112 between the module-handling tool and module-receiving region 332 is the stator module supported at fewer than two support locations in a direction along the module translation axis. In other words, at every point along the movement of stator module between module-receiving location 332 and a position in which it is fully engaged within module-handling tool 128, and vice versa, stator module 112 is supported by one of: 1) at least two module supports 400A-C; 2) at least module support 400A and the pair of bearing assemblies 312A; and 3) at least two of the pairs of bearing assemblies 312A-C.

Figure 6A:
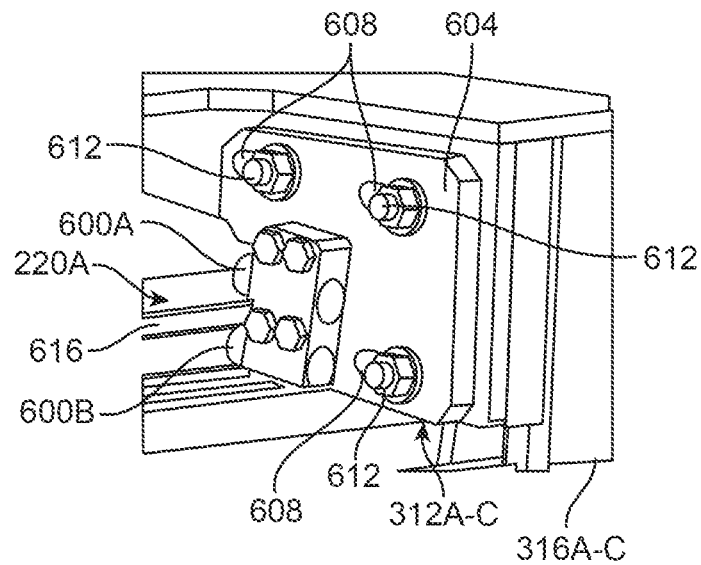
FIGS. 6A-B are enlarged perspective views of one of the movable roller bearing assemblies of the module-handling tool of FIGS. 1 and 3.
Figure 6B:
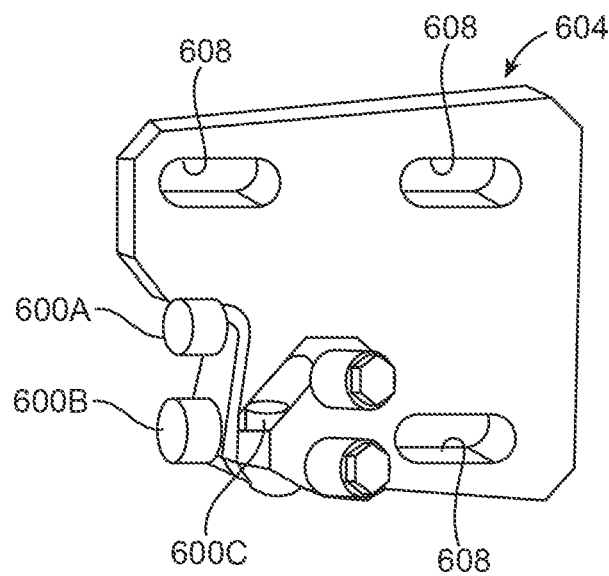

As mentioned above, each of bearing assemblies 312A-C is movable in a direction toward and away from the like bearing assembly on the opposite side of module-handling tool 128. This feature is provided to suit the particular configuration of stator module 112, in which end member 224 (FIG. 2) extends beyond the space between outer flanges 220A of support members 216A and core 200 of the stator module. Referring to FIGS. 6A-B, consequently, the roller 600A on each bearing assembly 312A-C cannot be engaged within that space without first moving the bearing assemblies on each sub-frame 308A-C (FIG. 6A) away from one another to allow end member 224 (FIG. 2) to pass by those assemblies as stator module 112 is being pulled into module-handling tool 128. To accommodate this movement, rollers 600A-B are mounted to base plate 604 having slotted holes 608 that receive the bolts 612 (FIG. 6A) that attach each bearing assembly 312A-C to the corresponding sub-frame 308A-C. FIG. 6A shows base plate 604 in its engaged-flange position in which rollers 600A-B are engaged with one of outer flanges 220A on stator module 112. As seen in FIG. 6B, each bearing assembly 312A-C includes a third roller 600C (FIG. 6B) mounted perpendicularly relative to rollers 600A-B. Third roller 600C is provided to firmly engage the lateral edge 616 (FIG. 6A) of the corresponding outer flange 220A on stator module 112 to provide lateral stability to the stator module once it is inside module-handling tool 128.

FIG. 4B shows stator module 112 in a position wherein end member 224 has been moved slightly past the pair of bearing assemblies 312A such that those bearing assemblies can now be fully engaged with the outer flanges 220A of the stator module as described above in connection with FIG. 6A, thereby at least momentarily providing the module with three support locations in a direction along module-translation axis 332, specifically, at the pair of bearing assemblies 312A and module supports 400A-B. Further pulling of stator module 112 into module-handling tool 128 by translator 328 will at some point leave the stator module supported only by the pair of bearing assemblies 312A and module support 400A.

Similarly, FIG. 4C shows stator module 112 in a position wherein end member 224 has been moved slightly past the pair of bearing assemblies 312B such that those bearing assemblies can now be engaged with the outer flanges 220A of the stator module as described above in connection with FIG. 6A, thereby, at least momentarily, providing the module with three support locations in a direction along module-translation axis 324, specifically, at the pair of bearing assemblies 312B, at the pair of bearing assemblies 312A, and at module support 400. Further pulling of stator module 112 into module-handling tool 128 by translator 328 will at some point leave the stator module supported only by the pairs of bearing assemblies 312A-B, and thereafter, supported by all three pairs of bearing assemblies 312A-C.

Figure 7A:
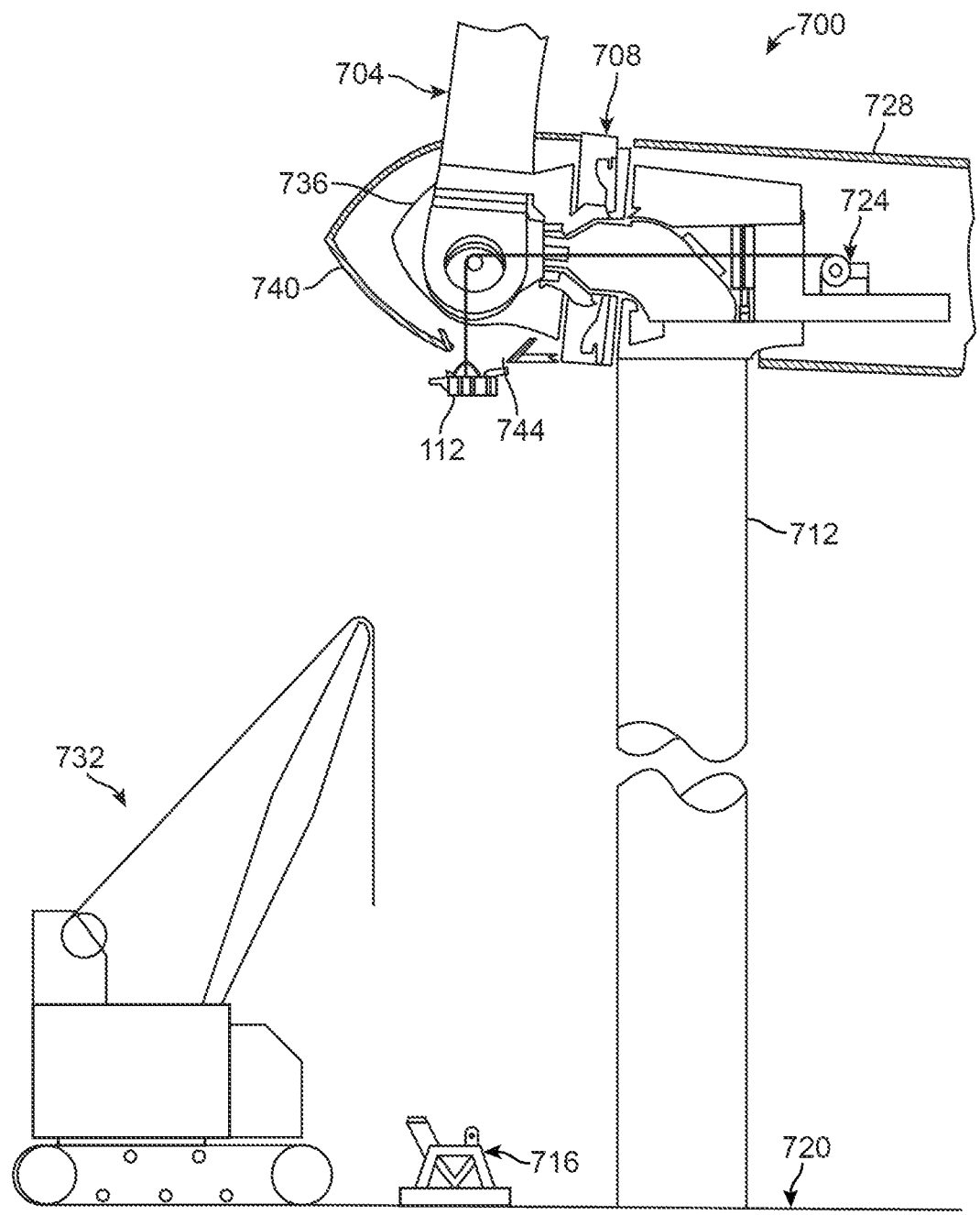
FIG. 7A is an elevational diagrammatic view of a wind power unit having a generator being serviced using a module-handling tool.
Figure 7B:
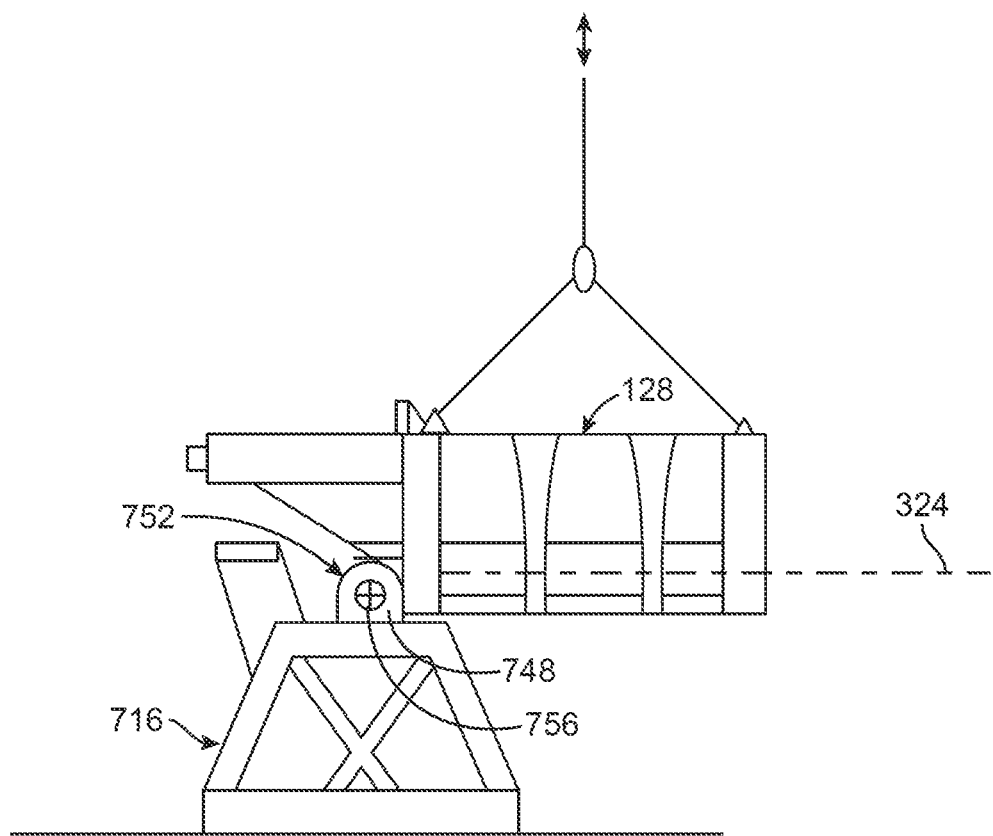
FIG. 7B is an enlarged side view of the module-handling tool support of FIG. 7A, showing the module-handling tool in a horizontal orientation.
Figure 7C:
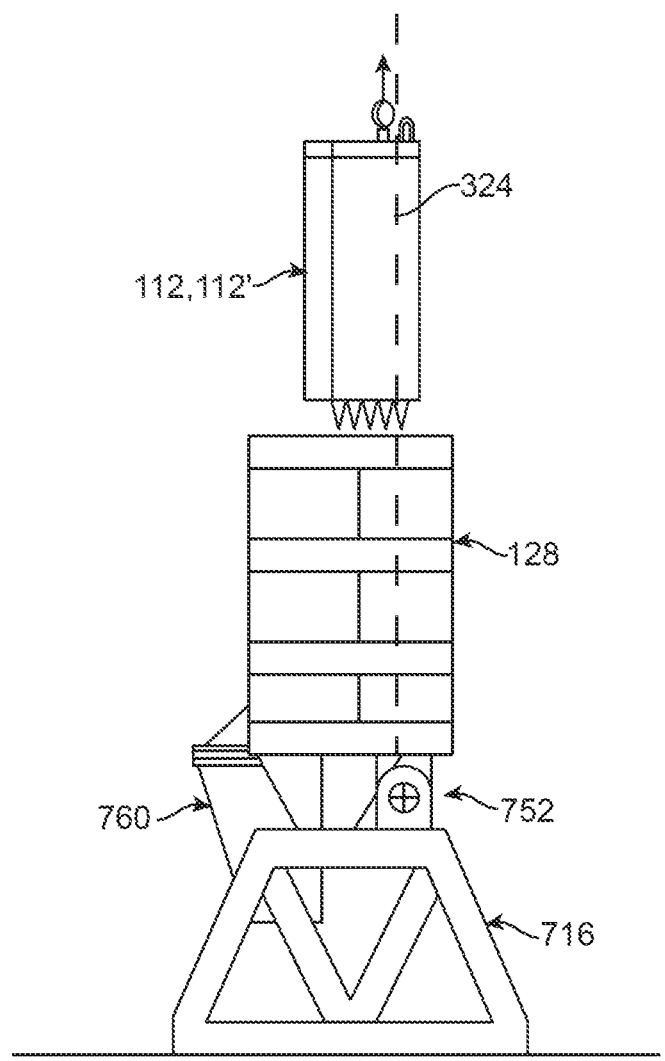
FIG. 7C is an enlarged side view of the module-handling tool support of FIG. 7A, showing the module-handling tool in a vertical orientation.

FIGS. 7A-C illustrate the use of an active-portion-module handling tool, such as module-handling tool 112 of FIGS. 1-6B, to service a wind power unit (WPU) 700 (FIG. 7A). As those skilled in the art will appreciate, WPU 700 includes a three-bladed horizontal-axis wind turbine 704 that, in this example, directly drives a permanent-magnet type electrical power generator 708, which, for the convenience of explanation, has the same general configuration as electromagnetic rotary machine 100 of FIG. 1. Referring to FIG. 1, in this example, generator 708 includes a plurality of permanent magnets 140 secured to rotor 104. Referring back to FIG. 7, WPU 700 is a land-based unit, with wind turbine 704 and generator 708 supported at the top of a tower 712. In this example, module-handling tool 128 is being used to replace one of the stator modules 112 (FIGS. 1 and 2) of generator 708. In addition to module-handling tool 128, equipment used for this servicing of generator 708 include a pivoting module-handling tool support 716 located on the ground 720, a WPU-based winch 724 mounted within the nacelle 728 of WPU 700 and a ground-based crane 732. Wind turbine 704 includes a central hub 736 contained within a relatively large nosecone 740. To give this example a sense of scale, the outside diameter of generator 708 is on the order of 8 meters. In this example, stator modules 112 of generator 708 are accessible from inside nosecone 740.

Referring to FIG. 7A, and also to other figures as indicated, the process of replacing a stator module 112 of generator 708 generally begins with removing permanent magnets 140 (FIG. 1) in the vicinity of the location on rotor 108 (FIG. 1) where module-handling tool 128 will be mounted to the rotor. This is done to relieve the target stator module 112 from the magnetic fields caused by such magnets 140 that would interfere with the removal and replacement process. Then, the empty module-handling tool 128 is hoisted into the interior of nosecone 740, and it is coupled to rotor 108, as shown in FIG. 3A, using rotor mount 340 and struts 344A-B. This can be accomplished with the alignment features on rotor 108 (FIG. 1) at bottom dead center, and hoisting module-handling tool 128 through a hatchway 744 in nosecone 740 using winch 724. Assuming the stator module 112 to be replaced is not also at bottom dead center, the now-secured module-handling tool 128 is moved to the appropriate location for removing the stator module. As mentioned above, this can be done in any of a number of ways, such as using a pony motor, a come-along, etc. Because rotor 108 (FIG. 1) is coupled to wind turbine 704, the wind turbine can be used in conjunction with a braking system (not shown) to "fly" module-handling tool 128 into the proper location using energy available in the wind. Once module-handling tool 128 is in the proper location, its position and orientation can be finely tuned, for example, using adjustable struts 344A-B (FIG. 3A).

At some point, the bolts and/or other features (not shown) that fixedly secure target stator module 112 (FIG. 1) to stator frame 116 need to be removed to allow the stator module to be removed from the stator frame. Then, hitch 316 (FIG. 3A) is attached to target stator module 112 and translator 328 (FIG. 3A) is activated so as to extract the stator module from stator 104 along module-translation axis 324. This extraction continues using the procedures described above in conjunction with FIGS. 4A-6 relative to individually engaging bearing assemblies 312A-C with target stator module 112 to accommodate the particular configuration of end member 224 (FIG. 2). Once stator module 112 is fully contained within module-handling tool 128 and free of stator 104, the loaded module handling tool is returned to bottom dead center and decoupled from rotor 108. Then, loaded module handling tool 128 is lowered to module-handling-tool support 716 below nosecone 740.

As seen in FIG. 7B, module-handling-tool support 716 includes a pair of spaced (in a direction into the page of FIG. 7B) pivot brackets 748 that are used to created a pivot joint 752 in conjunction with similar pivot brackets 416 (FIG. 4A) on module-handling tool 128. When module-handling tool 128 is lowered with its module-translation axis 324 largely horizontal to the proper location, a pair of pivot pins 756 are installed into the two pairs of brackets 748, 416 to form pivot joint 752. After pivot pins 756 have been installed, winch 724 is used to load pivot module-handling tool 128 so that its module-translation axis 324 is vertical, or nearly so, as shown in FIG. 7C. Once module-handling tool 128 has been pivoted vertically, a pivot stop 760 on module-handling-tool support 716 works in conjunction with pivot joint 752 to stabilize the module-handling tool in this vertical orientation. While module-handling tool 128 is in its vertical orientation, ground-based crane 732 (FIG. 7A) is used to extract removed stator module 112 from module-handling tool 128 and insert in its place a replacement stator module.

Those skilled in the art will readily appreciate that the installation of replacement stator module 112' can be accomplished by largely performing the foregoing steps in reverse. For example, and briefly, such steps can include:

pivoting newly loaded module-handling tool 128 to a horizontal position (FIG. 7B);

hoisting the loaded module-handling tool into nosecone 740;

coupling the loaded module-handling tool to rotor 104 (FIG. 1) at bottom dead center;

moving the loaded module-handling tool to module-receiving region 332 (FIG. 3) by rotating the rotor as needed;

fine tuning the position and orientation of the loaded module-handling tool as needed;

actuating translator 328 (FIG. 3) to push the new stator module into the module-receiving region;

decoupling hitch 316 (FIG. 3) from the new stator module;

securing the new stator module to stator frame 116 (FIG. 1);

moving the now-empty module-handling tool to bottom dead center by rotating the rotor as needed;

decoupling the now-empty module-handling tool from the rotor;

lowering the now-empty module-handling tool to ground 720; and installing previously removed permanent magnets 140 (FIG. 1).

Those skilled in the art will understand that if another one of stator modules 112 is to be replaced, then the steps can be different. For example, once new stator module 112' has been installed, module-handling tool can be moved to the location of the next stator module to be replaced and suitable ones of the module-removal steps described above can be repeated. Of course, there are other variations that are possible. In addition, it is noted that similar procedures can be used to build stator 104 in situ and to dismantle the stator. Skilled artisans will readily understand how to modify the procedures for the task at hand.

Figure 8:
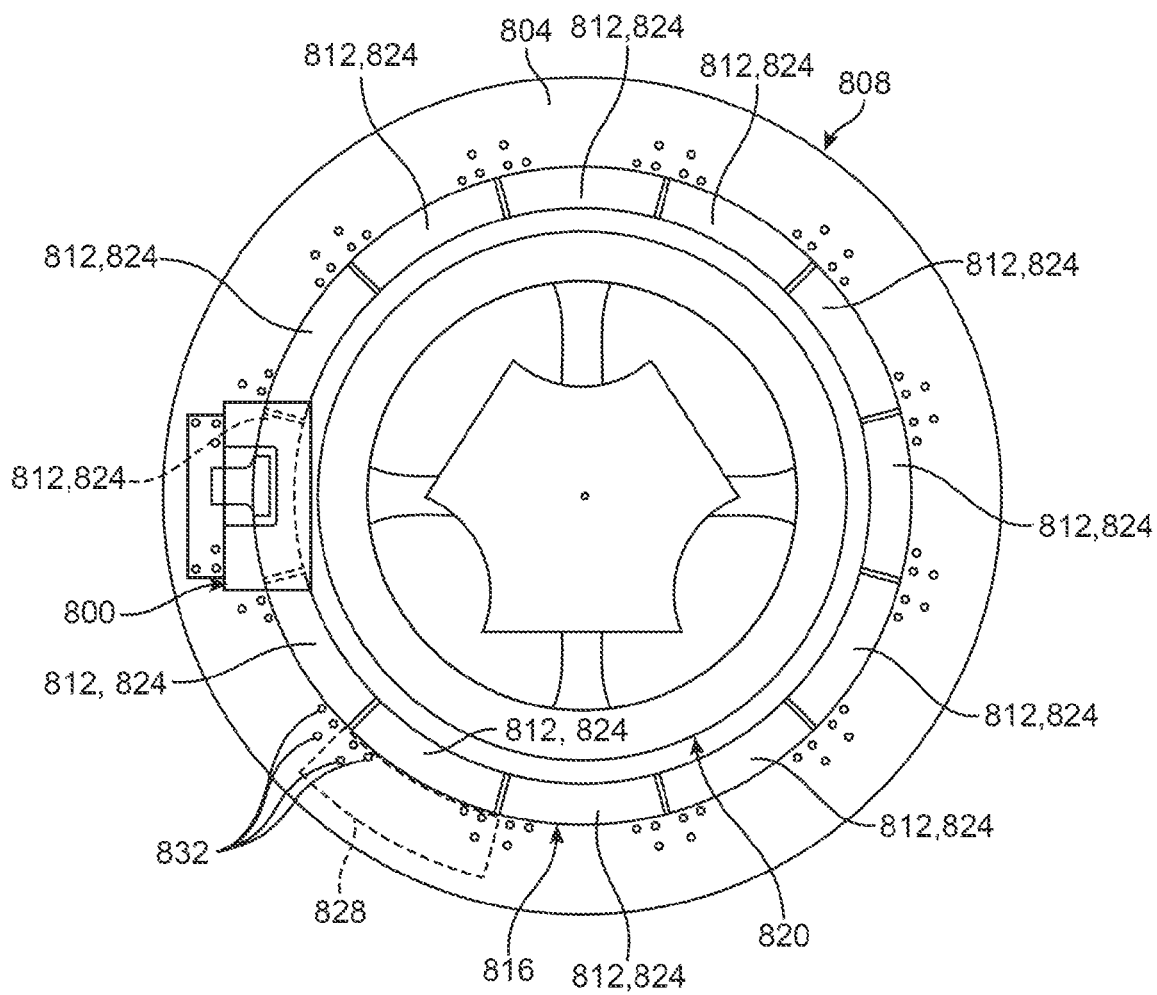
FIG. 8 is a front elevational view of an alternative electromagnetic rotary machine having a stator frame, showing a module-handling tool secured to the stator frame at a module-receiving region.

While FIGS. 1-7C are directed to an active-portion-module-handling tool that couples to the rotor of the electromagnetic rotary machine at issue, FIG. 8 illustrates and alternative arrangement in which the module-handling tool 800 directly mounts to the stator frame 804 of the machine 808. For the sake of simplicity, machine 808 is identical to machine 100 of FIG. 1, except for the mounting location of module-handling tool 800. Likewise, each of the stator modules 812 of the modular stator 816 of machine 808 of FIG. 8 are identical to module 112 of FIG. 2, and module-handling tool 800 is identical to module handling tool 128 of FIGS. 1, 3A-B and 4A-C, except for modifications made due to the fact that module-handling tool 800 attaches to stator frame 804 rather than rotor 820.

As those skilled in the art will readily appreciate, because stator 816 is fixed and module-handling tool 800 must be located at one of module-receiving regions 824 of stator 816 having a module 812 installed therein or removed therefrom, stator frame 804 is provided with a precisely located pattern 828 of bolt holes 832 at an exact location for each of the plurality of module-receiving regions. In this embodiment, pattern 828 and the ones of bolt holes 832 therein at each module-receiving region 824 are used to precisely position and align module-handling tool 800 relative to that module-receiving location to allow for smooth transfer of a stator module 812 between the module-handling tool and stator 816. It is noted that in this example, module-handling tool 800 does not have support and positioning struts like module-handling tool 128 of FIGS. 1-7C. This is so because in the arrangement of FIG. 8, module-handling tool 800 is completely supported by the connection utilizing pattern 828 and the corresponding ones of bolt holes 832.

While the foregoing examples are directed to a machine having a modularized stator, those skilled in the art will readily appreciate that the techniques and tools disclosed herein can be modified for use with other types of active portions. For example, some machines may have a rotor comprising electromagnets that provide the magnetic poles for the machine. Skilled artisans will understand that such a rotor can be modularized into a number of modules (identical to one another, or not) that each contain one or more of the electromagnets. A rotor-module-handling tool can be designed, configured, and used according to the same principles described above in connection with stator-module-handling tools 128, 800 described above by one or more suitable skilled artisans.

Though the exemplary module-handling tools 128, 800 described above are box-type tools that largely enclose the active-portion module when the module is fully engaged therein, those skilled in the art will recognize that other configurations for such tools are possible. For example, some alternative embodiments can have an open design in which the active-portion module is essentially supported by a base. In addition, it is noted that the exemplary module-handling tools 128, 800 are specifically suited for the special configuration of stator modules 112, 812 that utilizes T-shaped support members. In other alternative embodiments, the module-support scheme might be different. For example, the core of the modules might have T-shaped slots, rather than T-shaped members. In such a case, the bearings could be designed to engage those slots. Many alternative designs and configurations of an active-portion-module-handling tool made in accordance with the present disclosure are possible. Skilled artisans will recognize and will be able to implement such alternatives when presented with a particular module configuration or when designing a module-handling tool in conjunction with a particular active-portion module.

Further, it is noted that while bearings 312A-C are roller-type bearings, other types of bearings can be used. Examples of alternative bearing types include ball bearings and bearings made of a low-friction material, such as polytetrafluoroethylene, among others. The type, design, and location of the bearing(s) used in a particular active-portion-module-handling tool will depend generally on the design and configuration of the active-portion module at issue and of the tool itself.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A module-handling tool for inserting and/or removing a stator module that includes at least one electrical winding into and/or from a module-receiving location in an active stator portion of an electromagnetic machine that includes a rotor having a rotational axis, the module-handling tool comprising:
   a frame, said frame having a base and being designed and configured to be secured to the rotor of the electromagnetic machine during use of the module-handling tool to insert and/or remove the stator module into and/or from the module-receiving location;
   a module translation axis;
   at least one bearing supported by said frame and designed and configured to engage the stator module when said frame is secured to the rotor of the electromagnetic machine;
   a translator designed and configured to move the stator module along said translation axis when said frame is secured to the rotor of the electromagnetic machine; and
   a positioning system designed and configured for aligning, when said frame is secured to the rotor of the electromagnetic machine; said frame relative to the module-receiving location of the electromagnetic machine for insertion and/or removal of the stator module, respectively, into/from the module-receiving location.

2. A module-handling tool according to claim 1, wherein the electromagnetic machine is a generator that includes a rotor frame, said positioning system being designed and configured to connect to the rotor frame.

3. A module-handling tool according to claim 2, wherein the rotor frame includes a first plurality of tool alignment features, said positioning system including a second plurality of tool alignment features designed and configured to register with the first plurality of tool alignment features when the module-handling tool is in a proper position relative to the module-receiving location.

4. A module-handling tool according to claim 1, wherein the electromagnetic machine includes a stator frame that comprises a plurality of module supports spaced in a direction parallel to said module translation axis when the module-handling tool is engaged with the electromagnetic machine, and said at least one bearing includes a plurality of bearings spaced along said module translation axis so that the stator module is supported by no fewer than two supports at any time during use of the module-handling tool, wherein the no fewer than two supports consists of any combination of the plurality of module supports and said plurality of bearings.

5. A module-handling tool according to claim 4, wherein at least two of the plurality of module supports are designed and configured to support, during use of the module-handling tool, the stator module until the stator module is supported by at least one of said plurality of bearings.

6. A module-handling tool according to claim 1, wherein the electromagnetic machine is part of a wind-power-unit having a wind-turbine hub coupled to the electromagnetic machine, said positioning system being designed and configured to connect to the wind-turbine hub.

7. A module-handling tool according to claim 1, wherein said positioning system includes a pivotable connector for securing the module-handling tool to the electromagnetic machine, said pivotable connector pivotable in a direction perpendicular to said module translation axis.

8. A module-handling tool according to claim 7, further comprising at least one hinge connecting said pivotable connector to said frame.

9. A module-handling tool according to claim 1, wherein said at least one bearing includes a roller bearing.

10. A module-handling tool according to claim 1, wherein said at least one bearing is moveable in a plane perpendicular to said module translation axis so as to be selectively engageable with the stator module.

11. A module-handling tool according to claim 10, wherein said at least one bearing includes at least one pair of bearings moveable toward and away from each other on opposing sides of the stator module when the active-portion module is engaged with the module-handling tool.

12. A module-handling tool according to claim 1, wherein said frame includes at least one transverse sub-frame connected to said base.

13. A module-handling tool according to claim 12, wherein said at least one bearing is supported by said at least one transverse sub-frame.

14. A module-handling tool according to claim 13, wherein said at least one bearing supported by said at least one transverse sub-frame includes at least one pair of bearings supported by at least one transverse sub-frame.

15. A module-handling tool according to claim 1, further comprising a hitch connected to said translator and releasably connectable to the stator module.

16. A module-handling tool according to claim 1, wherein the electromagnetic machine is part of a wind power unit that includes a wind turbine hub and a generator-rotor frame, the wind turbine hub and the generator-rotor frame each having at least one strut-mount, said positioning system including at least one rotor frame strut connectable to the at least one rotor frame strut mount and at least one hub strut connectable to the at least one wind turbine hub strut mount.

17. A module-handling tool according to claim 1, wherein the stator module includes a core and first and second support members each having a flange, wherein said at least one bearing includes at least one bearing for engaging the flange of the first support member and at least one bearing for engaging the flange of the second support member.

18. A module-handling tool for inserting and/or removing a stator module that includes at least one electrical winding into and/or from a module-receiving location in an active stator portion of an electromagnetic machine that includes a rotor having a rotational axis, the module-handling tool comprising:
   a frame, said frame having a base and being designed and configured to be secured to the rotor of the electromagnetic machine during use of the module-handling tool to insert and/or remove the stator module into and/or from the module-receiving location;
   a module translation axis substantially parallel with said rotational axis of said electromagnetic machine when the module-handling tool is operatively positioned relative to the electromagnetic machine;
   at least one bearing supported by said frame and designed and configured to facilitate the movement of the stator module along said module translation axis;
   a translator designed and configured to move the stator module along said translation axis when said frame is secured to the rotor of the electromagnetic machine; and
   a positioning system designed and configured for aligning, when said frame is secured to the rotor of the electromagnetic machine, said frame relative to the module-receiving location of the electromagnetic machine for insertion and/or removal of the stator module, respectively, into/from the module-receiving location.

19. A module-handling tool according to claim 18, wherein the electromagnetic machine is a generator that includes a rotor frame, said positioning system being designed and configured to connect to the rotor frame.

20. A module-handling tool according to claim 19, wherein the rotor frame includes a first plurality of tool alignment features, said positioning system including a second plurality of tool alignment features designed and configured to register with the first plurality of tool alignment features when the module-handling tool is in a proper position relative to the module-receiving location.

21. A module-handling tool according to claim 18, wherein the electromagnetic machine includes a stator frame that comprises a plurality of module supports spaced in a direction parallel to said module translation axis when the module-handling tool is engaged with the electromagnetic machine, and said at least one bearing includes a plurality of bearings spaced along said module translation axis so that the stator module is supported by no fewer than two supports at any time during use of the module-handling tool, wherein the no fewer than two supports consists of any combination of the plurality of module supports and said plurality of bearings.

22. A module-handling tool according to claim 21, wherein at least two of the plurality of module supports are designed and configured to support, during use of the module-handling tool, the stator module until the stator module is supported by at least one of said plurality of bearings.

23. A module-handling tool according to claim 18, wherein the electromagnetic machine is part of a wind-power-unit having a wind-turbine hub coupled to the electromagnetic machine, said positioning system being designed and configured to connect to the wind-turbine hub.

24. A module-handling tool according to claim 18, wherein said positioning system includes a pivotable connector for securing the module-handling tool to the electromagnetic machine, said pivotable connector pivotable in a direction perpendicular to said module translation axis.

25. A module-handling tool according to claim 24, further comprising at least one hinge for connecting said pivotable connector to said frame.

26. A module-handling tool according to claim 18, wherein said at least one bearing includes a roller bearing.

27. A module-handling tool according to claim 18, wherein said at least one bearing is moveable in a plane perpendicular to said module translation axis so as to be selectively engageable with the stator module.

28. A module-handling tool according to claim 27, wherein said at least one bearing includes at least one pair of bearings moveable toward and away from each other on opposing sides of the stator module when the stator module is engaged with the module-handling tool.

29. A module-handling tool according to claim 18, wherein said frame includes at least one transverse sub-frame connected to said base.

30. A module-handling tool according to claim 29, wherein said at least one bearing is supported by said at least one transverse sub-frame.

31. A module-handling tool according to claim 30, wherein said at least one bearing supported by said at least one transverse sub-frame includes at least one pair of bearings supported by at least one transverse sub-frame.

32. A module-handling tool according to claim 18, further comprising a hitch connected to said translator and releasably connectable to the stator module.

33. A module-handling tool according to claim 18, wherein the electromagnetic machine is part of a wind power unit that includes a wind turbine hub and a generator-rotor frame, the wind turbine hub and the generator-rotor frame each having at least one strut-mount, said positioning system including at least one rotor frame strut connectable to the at least one rotor frame strut mount and at least one hub strut connectable to the at least one wind turbine hub strut mount.

34. A module-handling tool according to claim 18, wherein the stator module includes a core and first and second support members each having a flange, wherein said at least one bearing includes at least one bearing for engaging the flange of the first support member and at least one bearing for engaging the flange of the second support member.

35. A module-handling tool according to claim 18, wherein said at least one bearing is designed and configured to engage the stator module.

* * * * *